United States Patent
Ota et al.

[11] Patent Number: 5,144,512
[45] Date of Patent: Sep. 1, 1992

[54] MAGNETIC RECORDING DISK HAVING TEXTURED SURFACE

[75] Inventors: Kiyoshi Ota; Kazuhiro Kimura; Kenji Yazawa, all of Miyagi, Japan

[73] Assignee: Sony Corporation, Tokyo, Japan

[21] Appl. No.: 644,222

[22] Filed: Jan. 22, 1991

[30] Foreign Application Priority Data

Jan. 19, 1990 [JP] Japan .................................. 2-008508
Nov. 2, 1990 [JP] Japan .................................. 2-298724

[51] Int. Cl.$^5$ .............................................. G11B 5/82
[52] U.S. Cl. ..................................... 360/135; 360/131
[58] Field of Search ........................ 360/131, 133, 135; 428/579, 694, 900, 410

[56] References Cited

U.S. PATENT DOCUMENTS 4,985,306  1/1991  Morizane .......................... 360/135 X
4,996,622  2/1991  Takatsuki .......................... 360/135

Primary Examiner—A. J. Heinz
Attorney, Agent, or Firm—Steadman & Simpson Hill, VanSanten

[57] ABSTRACT

A magnetic recording disk comprising at least a magnetic layer on a circular rigid substrate with a physically abraded surface having a uniform series of physical circumferential texturing, wherein the relationship between the value Rv from the diametrical arithmetic-average center line to the deepest valley and the value Rp from such center line to the highest peak is selectively determined as Rp/Rv≧0.6 so that the CSS durability is enhanced.

8 Claims, 1 Drawing Sheet

MAGNETIC RECORDING DISK HAVING TEXTURED SURFACE

BACKGROUND OF THE INVENTION

1. Field of the Invention

The present invention relates to a magnetic recording disk (known as a hard disk) where a magnetic layer is formed on a circular rigid substrate.

2. Description of the Prior Art

It is generally customary that circular magnetic recording disks adapted for random access are widely used as storage media in computers and so forth. Out of such-storage media, particularly a hard disk with a substrate of aluminum alloy or the like is employed as a stationary or external disk due to a high response speed and a great storage capacity.

In such magnetic recording disk (hard disk), with respect to the running facility and durability thereof, an adequate surface roughness is required with extremely fine irregularities on its surface which is to be in contact with a magnetic head. For example, there is known a texturing process which is a technique of lapping the surface of a circular rigid substrate in the circumferential direction and forming extremely fine scars to thereby control the surface roughness.

In this case, the surface roughness of the magnetic recording disk is restricted principally by the flying distance of the magnetic recording head and the CSS (contact start-stop) characteristics. And any excessive surface roughness causes a trouble termed head hit, while any insufficient surface roughness causes an increase of the friction coefficient to the magnetic recording head.

It is therefore examined of late to enhance the durability and eliminate undesired adhesion of the magnetic recording head by first evaluating the surface roughness of the magnetic recording disk on the basis of the average roughness Ra at the center line and then optimizing such roughness to reduce the maximum frictional force against the magnetic recording head (as disclosed in Japanese Patent Laid-open No. Sho 62 (1987)-46429).

From the studies promoted by the present inventors with respect to the CSS durability which is the most important characteristic in the magnetic recording head, it has been concluded that a satisfactory result is not attainable merely by prescribing the average roughness at the center line.

OBJECT AND SUMMARY OF THE INVENTION

The present invention has been accomplished on the basis of such strenuous studies. And its object is to provide an improved magnetic recording disk which ensures remarkably high CSS durability in addition to a minimal friction coefficient against a magnetic recording head.

In a magnetic recording disk where its surface is so textured that the roughness thereof is prescribed, the feature of the present invention resides in enhancing the CSS (contact start-stop) durability by optimizing the relationship between the value Rv from the diametrical arithmetic-average center line to the deepest valley and the value Rp from such center line to the highest peak.

According to one aspect of the present invention, there is provided a magnetic recording disk comprising a flat smooth substrate with a physically abraded surface having a uniform series of physical circumferential texturing; and a magnetic layer formed over the substrate and having radial roughness factors Rp and Rv selectively determined to satisfy the condition of $Rp/Rv \geq 0.6$.

The above and other features and advantages of the present invention will become apparent from the following description which will be given with reference to the illustrative accompanying drawings.

DESCRIPTION OF THE PREFERRED EMBODIMENTS

In an attempt to achieve the object mentioned. The inventors have continued incessant examinations and studies to finally find that, depending on the state of surface irregularities on a magnetic recording disk, a difference occurs in the time during which a frictional force is exerted between the magnetic head and the surface of the magnetic recording disk. From the detailed studies and experiments carried out relative to the temporal change of the frictional force applied at the CSS action to the magnetic head, it has been confirmed that the frictional-force exertion time becomes shorter when a certain relationship is existent between a value Rv from the arithmetic-average center line of the diametrical surface irregularities on the magnetic disk to the deepest valley and another value Rp from such center line to the highest peak, and the best CSS characteristic can be obtained when the said conditional relationship is satisfied.

The present invention based on such discovery is concerned with a magnetic disk where at least a magnetic layer is formed on a circular rigid substrate textured in the circumferential direction. And the feature of the present invention resides in that a relationship of $Rp/Rv \geq 0.6$ is satisfied with regard to the value Rv from the arithmetic-average center line of diametrical surface irregularities on the magnetic recording disk to the deepest valley and the value Rp from such center line to the highest peak.

Figure 1:
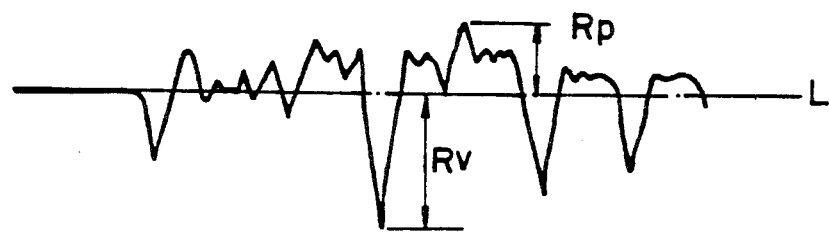
FIG. 1 shows a typical example of roughness factors Rp and Rv.

As shown in FIG. 1, the value Rv from the arithmetic-average center line of the surface irregularities to the deepest valley and the value Rp from the same center line to the highest peak are obtained by first calculating the center line L based on the arithmetic-average of the heights of the surface irregularities in a measured area, then determining the distance from the center line L to the deepest valley in such measured area, and the distance from the center line L to the highest peak in the same measured area. The values Rv and Rp thus obtained become widely different depending on the amplitude distribution of the surface irregularities even when the center-line average roughness on the surface of the magnetic recording disk remains unchanged.

In the present invention, the surface state of the rigid substrate is so controlled that the values Rv and Rp of the surface irregularities on the magnetic recording disk are set to satisfy the relationship of $Rp/Rv \geq 0.6$. The state of the surface irregularities concerning the subject here relates to the magnetic disk surface which is to be practically in contact with the magnetic head. Therefore, in case the surface of the magnetic layer is brought directly into contact with the magnetic head, the surface state of the magnetic layer needs to satisfy the above-described conditional relationship. Meanwhile, if a protective carbon film is formed on the surface of the magnetic layer, the surface state of such carbon film needs to satisfy the said relationship.

The center-line average roughness factor Ra and the maximum height Rmax may be numerically arbitrary. However, any excessive surface roughness brings about an impediment to the motion of the magnetic head and comes to deteriorate the electromagnetic transducing characteristics. It is therefore preferred that the center-line average roughness factor Ra be set to less than 20 nm, and the maximum height Rmax to less than 200 nm.

The surface state of the rigid substrate is controlled by a texturing process, which is preferably executed by the technique of rubbing a lapping tape against the substrate in the circumferential direction and thereby forming extremely fine scars on the substrate surface in the circumferential direction. The values Rv and Rp of the surface irregularities on the magnetic recording disk are controllable by changing the kind (e.g., surface roughness) of the lapping tape or combining one tape with another of a different kind.

The disk substrate to be textured may be any of rigid ones such as an aluminum or aluminum alloy substrate, a Ni-P placed aluminum or aluminum alloy substrate, an alumitized aluminum or aluminum alloy substrate, a glass substrate, or a plastic substrate composed of polyether-imide, polycarbonate, polysulfone, polyether-sulfone, polyacetal, or polyphenylene sulfide.

Meanwhile the magnetic layer formed on the rigid substrate may be a magnetic film obtained by coating the substrate with a magnetic material composed principally of magnetic particles and a binder, or may be a metallic thin film of a ferromagnetic metal material (e.g. Co-Ni alloy, Co-Cr-Ta alloy, or Co-Cr-Ni alloy) by the thin-film forming technique of plating, evaporation, sputtering or the like, and there is no restriction thereto at all. When a metallic thin film is formed on the magnetic layer, a primary coat film may be provided if necessary. In this case, exemplary suitable materials of such primary coat film are Bi, Cr and so forth, and the thickness thereof may generally be set to a value on the order of several ten to thousand angstroms (e.g., 700 to 1000 Å in a Cr film).

Furthermore a protective carbon film and a lubricative layer may also be formed on the surface of the aforementioned magnetic layer, if necessary. The kind of a lubricant may be selected as desired, and in particular a lubricant of perfluoropolyether is suitable. It is preferred that the thickness of the protective carbon film be within a range of 200 to 500 Å, and the thickness of the lubricative layer be within a range of 20 to 60 Å.

Figure 2A:
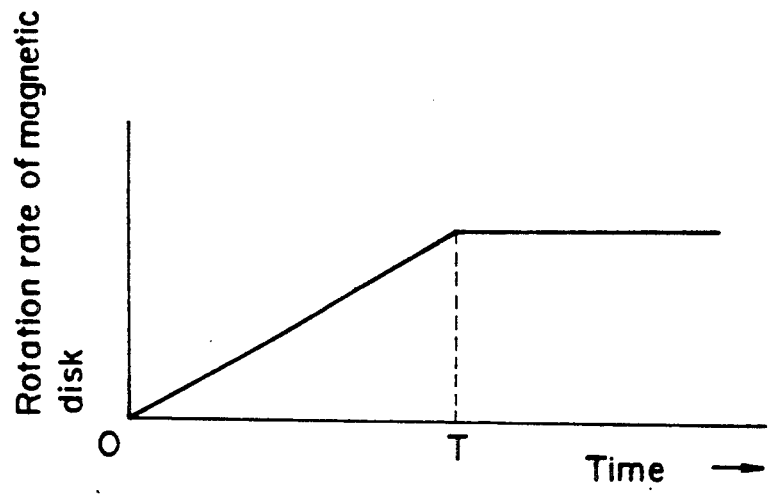
FIG. 2(A) graphically shows a characteristic curve representing the rotation rate of a magnetic recording disk at the beginning of a CSS action.
Figure 2B:
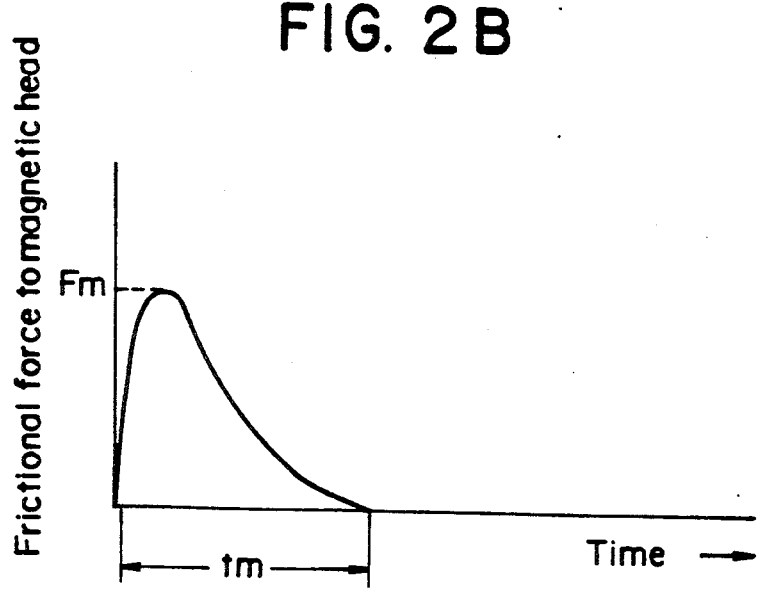
FIG. 2(B) graphically shows a characteristic curve representing the changes of a frictional force caused in relation to FIG. 2(A).

When the rotation rate of the magnetic recording disk is gradually raised as graphically shown in FIG. 2 (A) while the magnetic head is kept in contact therewith, the frictional force generated between the magnetic head and the magnetic disk surface at the beginning of the CSS action is such as shown in FIG. 2(B). At this time, the amount of the damage caused to the magnetic disk or the magnetic head is given by an integral of the frictional force.

The characteristic curve of the frictional force changes depending on the values Rv and Rp of the surface irregularities on the magnetic recording disk. If the ratio Rp/Rv is small, the maximum frictional force $F_m$ applied to the magnetic head indicates merely a slight change, but the time tm required until reduction of the frictional force to zero with a fly of the magnetic head tends to be longer. This signifies that the frictional force to the magnetic head drags on with a decrease of the ratio Rp/Rv to consequently prolong the time during which the magnetic head remains in contact with the surface of the magnetic recording disk.

Therefore, when the surface roughness is increased for example to reduce the maximum frictional force, normally the value Rv is rendered greater to eventually decrease the ratio Rp/Rv, whereby the time $t_m$ required until reduction of the frictional force to zero is prolonged to increase the integral thereof, hence deteriorating the CSS durability as a result.

In contrast therewith, according to the present invention where the ratio Rp/Rv is set to be greater than 0.6, the time tm required until reduction of the frictional force to zero is shortened to consequently ensure sufficient CSS durability.

Hereinafter the present invention will be described in detail with reference to some specific experimental results.

EXPERIMENTAL EXAMPLE 1

Each of sample disks used in this experiment was produced by sequentially forming a magnetic layer, a protective carbon film and a lubricative layer on an aluminum substrate placed with Ni-P alloy where the state of surface irregularities was changed by a texturing process. The magnetic layer was formed by sputtering Co-Ni alloy to a thickness of 500 Å. And a bismuth film of 100 Å in thickness was formed as a primary coat layer on the magnetic layer. Meanwhile the thickness of the protective carbon film was set to 350–400 Å, and that of the lubricative layer to 40 Å, respectively. The lubricant used therein was perfluoropolyether (trade name: FOMBLIN).

Tables 1-1 and 1-2 show the individual values with regard to each of the sample disks, including the aforementioned roughness factors Rp, Rv, Rp/Rv; the maximum frictional force $F_m$ applied to the magnetic head; and the time $t_m$ required until the frictional force is reduced to zero with a fly of the magnetic head. The sample disks listed in Table 1-1 correspond to the embodiments of the present invention, and those listed in Table 1-2 correspond to comparative examples.

The values of Rp, Rv and Rp/Rv in each sample disk were obtained by actual measurement after completion of the magnetic layer and the protective carbon film, and the length of measurement was 0.6 mm.

The maximum frictional force $F_m$ and the time $t_m$ were measured under the conditions that the rotation rate of the magnetic disk was set to 3600 rpm, and the time [T in FIG. 2(A)] required until arrival of the rotation rate at such value was set to 4 seconds.

TABLE 1-1

|   | Rp (nm) | Rv (nm) | Rp/Rv | $F_m$ (g) | $t_m$ (sec) |
|---|---------|---------|-------|-----------|-------------|
| A | 31.9    | 49.1    | 0.65  | 3.0       | 1.9         |
| B | 44.1    | 70.0    | 0.63  | 2.7       | 1.9         |
| C | 42.4    | 60.2    | 0.70  | 2.7       | 1.9         |
| D | 37.5    | 60.0    | 0.63  | 2.9       | 1.9         |
| E | 82.9    | 87.9    | 0.94  | 2.0       | 1.7         |
| F | 81.2    | 72.6    | 1.12  | 1.9       | 1.7         |

TABLE 1-2

|   | Rp (nm) | Rv (nm) | Rp/Rv | $F_m$ (g) | $t_m$ (sec) |
|---|---------|---------|-------|-----------|-------------|
| G | 25.5 | 69.3 | 0.37 | 3.1 | 2.4 |
| H | 27.7 | 90.3 | 0.31 | 3.0 | 3.2 |
| I | 44.7 | 86.0 | 0.52 | 2.7 | 3.0 |
| J | 37.7 | 85.5 | 0.44 | 2.7 | 3.0 |
| K | 33.7 | 70.2 | 0.38 | 2.9 | 2.5 |

As is apparent from the above tables, when the surface state of the magnetic recording disk is so controlled that the ratio Rp/Rv becomes greater than 0.6, particularly the time $t_m$ required until reduction of the frictional force to zero is rendered shorter, and the integral of the frictional force is minimized.

EXPERIMENTAL EXAMPLE 2

Each of sample disks was produced similarly to the above-described Experimental Example 1 with the exception that the magnetic layer was composed of Co-Cr-Ta alloy, and the primary coat layer was composed of Cr. The thickness of such Co-Cr-Ta alloy layer was set to 500 Å and that of the Cr layer to 700 Å, respectively. A preferred composition range of the Co-Cr-Ta alloy as the magnetic layer is so selected that, in $Co_xCr_yTa_z$ (where x, y, z denote the percent by weight), $$4 \leq y < 20$$

$$0 < z \leq 5$$

x = remainder

In this example, the composition was selectively determined as $Co_{86}Cr_{12}Ta_2$.

Regarding such sample disks also, measurements were executed with respect to the roughness factors Rp, Rv, Rp/Rv, the maximum frictional force $F_m$ applied to the magnetic head, and the time $t_m$ required until the frictional force becomes zero due to a fly of the magnetic head. The results of such measurements are shown in Tables 2-1 and 2-2. The sample disks listed in Table 2-1 correspond to the embodiments of the present invention, and those listed in Table 2-2 correspond to comparative examples.

TABLE 2-1

|   | Rp (nm) | Rv (nm) | Rp/Rv | $F_m$ (g) | $t_m$ (sec) |
|---|---------|---------|-------|-----------|-------------|
| a | 48.2 | 40.3 | 1.20 | 1.9 | 1.9 |
| b | 39.5 | 56.7 | 0.70 | 2.0 | 1.8 |
| c | 36.1 | 57.1 | 0.63 | 2.5 | 1.8 |
| d | 48.9 | 52.8 | 0.93 | 2.9 | 1.9 |
| e | 73.5 | 83.2 | 0.88 | 2.7 | 1.7 |

TABLE 2-2

|   | Rp (nm) | Rv (nm) | Rp/Rv | $F_m$ (g) | $t_m$ (sec) |
|---|---------|---------|-------|-----------|-------------|
| f | 13.8 | 41.4 | 0.33 | 3.0 | 3.0 |
| g | 23.6 | 53.4 | 0.44 | 2.8 | 2.6 |
| h | 36.0 | 72.3 | 0.50 | 2.8 | 2.7 |
| i | 21.1 | 38.1 | 0.55 | 3.1 | 2.9 |

TABLE 2-2-continued

|   | Rp (nm) | Rv (nm) | Rp/Rv | $F_m$ (g) | $t_m$ (sec) |
|---|---------|---------|-------|-----------|-------------|
| j | 17.6 | 45.1 | 0.39 | 2.7 | 2.7 |

In an exemplary case where the magnetic layer is composed of Co-Cr-Ta alloy ($Co_{86}Cr_{12}Ta_2$), it is also obvious that the integral of the frictional force is reduced by setting the ratio Rp/Rv to a value greater than 0.6.

Furthermore, similar experiments were conducted by changing the composition of the magnetic layer to $Co_{84}Cr_{12}Ta_4$, and the results achieved were similar to those obtained with regard to the aforementioned composition of $Co_{86}Cr_{12}Ta_2$.

As described hereinabove, according to the present invention where the ratio Rp/Rv of the surface irregularities on the magnetic recording disk is set to be greater than 0.6, the damage caused to the magnetic head or the magnetic disk (particularly the integral of the frictional force) can be diminished to consequently attain an advantage of enhancing the CSS durability.

What is claimed is:

1. A magnetic recording disk comprising:
    a flat smooth substrate with a physically abraded surface having a uniform series of physical circumferential texturing; and
    a magnetic layer formed over said substrate and having radial roughness factors Rp and Rv selectively determined to satisfy the condition of Rp/Rv ≧ 0.6.

2. A magnetic recording disk according to claim 1, wherein the radial roughness factors Ra and Rmax of said magnetic layer are selectively determined to satisfy the conditions of Ra ≦ 20 nm and Rmax ≦ 200 nm respectively.

3. A magnetic recording disk comprising:
    a flat smooth substrate with a physically abraded surface having a uniform series of physical circumferential texturing;
    a primary coat layer formed over said substrate;
    a magnetic layer formed over said primary coat layer and composed of a metal thin film;
    a protective carbon layer formed over said magnetic layer; and
    a lubricative layer formed over said protective carbon layer and having radial roughness factors Rp and Rv selectively determined to satisfy the condition of Rp/Rv ≧ 0.6.

4. A magnetic recording disk according to claim 3, wherein said primary coat layer is composed of Cr; and said magnetic layer has a composition of $Co_xCr_yTa_z$ in which x, y, z denote the percent by weight selected as 4 ≦ y ≦ 20, 0 < z ≦ 5, and x is the remainder.

5. A magnetic recording disk according to claim 3, wherein said protective carbon layer has a thickness of 200 to 500 Å.

6. A magnetic recording disk according to claim 3, wherein said lubricative layer has a thickness of 20 to 60 Å.

7. A magnetic recording disk according to claim 3, wherein said lubricative layer contains perfluoropolyether.

8. A magnetic recording disk according to claim 4, wherein said primary coat layer has a thickness of 700 to 1000 Å.

* * * * *